US012462404B2

(12) United States Patent
Boult

(10) Patent No.: US 12,462,404 B2
(45) Date of Patent: *Nov. 4, 2025

(54) SYSTEM AND METHOD FOR TRANSFORMING VIDEO DATA INTO DIRECTIONAL OBJECT COUNT

(71) Applicant: PUSHPIN TECHNOLOGY, L.L.C., Evergreen, CO (US)

(72) Inventor: Terrance Edward Boult, Colorado Springs, CO (US)

(73) Assignee: PUSHPIN TECHNOLOGY, L.L.C., Evergreen, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,858

(22) Filed: Apr. 24, 2024

(65) Prior Publication Data

US 2024/0273737 A1 Aug. 15, 2024

Related U.S. Application Data

(63) Continuation of application No. 17/650,744, filed on Feb. 11, 2022, now Pat. No. 12,002,225, which is a
(Continued)

(51) Int. Cl.
*G06T 7/254* (2017.01)
*G06N 20/00* (2019.01)
(Continued)

(52) U.S. Cl.
CPC ............ *G06T 7/254* (2017.01); *G06N 20/00* (2019.01); *G06T 5/50* (2013.01); *G06T 7/215* (2017.01)

(58) Field of Classification Search
CPC ........... G06T 7/254; G06T 5/50; G06T 7/215; G06T 2207/20081; G06T 2207/30236;
(Continued)

(56) References Cited

U.S. PATENT DOCUMENTS 5,748,775 A * 5/1998 Tsuchikawa ........... G06V 20/52
382/190
5,805,210 A * 9/1998 Sekiya .................. H04N 7/188
368/9
(Continued)

OTHER PUBLICATIONS

Boult T. E.., Micheals, R., Gao, X., Lewis, P., Power, C., Yin, W., Erkan, A. "Frame-rate omnidirectional surveillance and tracking of camouflaged and occluded targets." Sep. 1999, pp. 48-55, Proceedings Second IEEE Workshop on Visual Surveillance (VS'99)(Cat. No. 98-89223).
(Continued)

*Primary Examiner* — Xuemei G Chen
(74) *Attorney, Agent, or Firm* — Welsh Flaxman & Gitler LLC

(57) ABSTRACT

The present invention is a computer-implemented system and method for transforming video data into directional object counts. The method of transforming video data is uniquely efficient in that it uses only a single column or row of pixels in a video camera to define the background from a moving object, count the number of objects and determine their direction. By taking an image of a single column or row every frame and concatenating them together, the result is an image of the object that has passed, referred to herein as a sweep image. In order to determine the direction, two different methods can be used. Method one involves constructing another image using the same method. The two images are then compared, and the direction is determined by the location of the object in the second image compared to the location of the object in the first image. Due to this recording method, elongation or compression of the objects can occur because of acceleration or deceleration of the objects and can be uniquely utilized to determine the speed or movement path of the objects. The second method of determining direction involves comparing the object in the
(Continued)

image to an established marker. The transformations can also be used to produce labeled data for training machine learning models; bounding-boxes provided in sweep image can be transformed to bound boxes in video, and boxes in video can be transformed into boxes in the sweep image.

6 Claims, 9 Drawing Sheets

Related U.S. Application Data continuation of application No. 16/435,008, filed on Jun. 7, 2019, now Pat. No. 11,288,820.

(60) Provisional application No. 62/682,906, filed on Jun. 9, 2018.

(51) Int. Cl.
*G06T 5/50* (2006.01)
*G06T 7/215* (2017.01)

(58) Field of Classification Search
CPC .......... G06T 2207/30242; G06N 20/00; G06V 20/52
See application file for complete search history.

(56) References Cited

U.S. PATENT DOCUMENTS

| | | | |
|---|---|---|---|
| 6,639,596 B1* | 10/2003 | Shum | G06T 3/4038 345/427 |
| 6,711,293 B1 | 3/2004 | Lowe | |
| 7,006,128 B2 | 2/2006 | Xie et al. | |
| 9,420,177 B2* | 8/2016 | Pettegrew | H04N 23/21 |
| 10,332,562 B2* | 6/2019 | Goranson | G11B 20/00007 |
| 2002/0105593 A1* | 8/2002 | Abe | G11B 27/002 348/700 |
| 2004/0125124 A1* | 7/2004 | Kim | G06F 16/7847 |
| 2006/0048191 A1* | 3/2006 | Xiong | G06V 30/2504 725/52 |
| 2008/0123954 A1* | 5/2008 | Ekstrand | G06F 16/739 382/173 |
| 2013/0148848 A1* | 6/2013 | Lee | G06V 20/52 382/103 |
| 2013/0306732 A1* | 11/2013 | Berssen | G06K 7/10722 235/462.08 |
| 2014/0097845 A1* | 4/2014 | Liu | G01R 33/5611 382/160 |
| 2015/0161797 A1* | 6/2015 | Park | H04N 13/128 382/154 |
| 2015/0181178 A1* | 6/2015 | Richard | H04N 25/701 348/270 |
| 2015/0324635 A1* | 11/2015 | Tanaka | G06K 19/07749 340/5.91 |
| 2016/0343411 A1* | 11/2016 | Sirot | G06T 7/246 |
| 2017/0140542 A1* | 5/2017 | Hodohara | G06T 7/55 |
| 2017/0213063 A1* | 7/2017 | Downing | G06K 7/1439 |
| 2017/0344811 A1* | 11/2017 | Ni | G06V 40/172 |
| 2019/0130560 A1* | 5/2019 | Horowitz | G06V 10/82 |
| 2019/0197701 A1* | 6/2019 | Krishnamurthy | H04N 13/204 |
| 2020/0242391 A1* | 7/2020 | Takahashi | G06V 10/44 |

OTHER PUBLICATIONS

Gao, Xiang, Terrance E. Boult, Frans Coetzee, and Visvanathan Ramesh "Error analysis of background adaption." Jun. 2000, pp. 503-510, Proceedings IEEE Conference on Computer Vision and Pattern Recognition. CVPR 2000 (Cat. No. PR00662).

Bradski, G. & Kaehler, A. "Learning OpenCV: Computer vision with the OpenCV library." 577 pages, Sep. 2008, O'Reilly Media, Inc., Sebastopol.

Nunes, M., et al., "What Did I Miss? Visualizing the Past through Video Traces," ECSCW'07: Proceedings of the Tenth European Conference on Computer Supported Cooperative Work, Sep. 2007.

* cited by examiner

SYSTEM AND METHOD FOR TRANSFORMING VIDEO DATA INTO DIRECTIONAL OBJECT COUNT

This application is a continuation of U.S. patent application Ser. No. 17/650,744, entitled "System and Method for Counting Vehicles with Computer Vision." filed Feb. 11, 2022, continuation of U.S. patent application Ser. No. 16/435,008, entitled "System and method for transforming video data into directional object count." filed Jun. 7, 2019, which claims the benefit of U.S. Provisional Patent Application Ser. No. 62/682,906, entitled "System and method for transforming video data into directional object count," filed Jun. 9, 2018, the contents of which are incorporated herein by reference.

FIELD OF THE INVENTION

The present invention relates to methods, systems, and apparatuses for discerning useful information and data about moving objects in an image sequence. More specifically, the invention provides useful information including moving object count as potentially providing the direction and speed of the object travel, all using low-cost video imaging data of that area.

BACKGROUND OF THE INVENTION

Images and video can be rich mediums to encode and transfer information; however, machines are notoriously ineffective at extracting meaning from those mediums. A computer that could see and understand what it sees like a human can is of obvious value. It became evident that what humans, even infants, could easily do, machines could not. It is much easier to teach a machine the steps to perform complex tasks involving higher mathematics than to teach them the comparably intuitive task of object recognition. In the 1970s, the attention shifted to attempting to break computer vision into its component pieces. These new approaches laid the groundwork for many vision techniques that exist today such as edge detection, non-polyhedral and polyhedral modeling, representation of objects as interconnections of smaller structures, optical flow, and motion estimation.

These approaches have allowed significant advances in computer vision, and they support the growing application of machine learning approaches to understand images; often, machine learning algorithms use traditional computer vision approaches to improve efficiency and accuracy. Traditional computer vision and machine-learned computer vision face trade-offs and can often complement one another in the field. Both require significant computing resources when evaluating video because they must mathematically evaluate each pixel in a sequence of images to extract useful information.

There are several traditional approaches to extracting a moving object from an image sequence. The first common approach in the prior art is the use of video cameras combined with background subtraction to detect objects in each frame of video and then to track the object over time. This approach, called "standard-background-detection," while somewhat effective is computationally quite expensive seeing that it must compare each pixel in each frame of video to a background to decide if it is sufficiently different. It then connects the pixels that are sufficiently different into distinct objects and associates these objects over time.

This approach accounts for all variables associated with the object and its relative movement, including the direction in both the two-dimensional and three-dimensional field and the size of the object. If there is little to no constraint on the object motion, this more general approach may be required. However, in many applications, the flow is constrained, for example, on most roads and in entrances or exits from parking areas. In these cases, the flow of cars has very limited directions and a narrow set of expected positions. In other cases, such as the flow of people through a corridor entrance, the motion can be limited, either in or out.

In general, determining the contents of the background image comprises 1) generating a background image that is as close to what one should expect the background to look like; and 2) updating the image to account for temporal changes including changes in illumination or shadows.

U.S. Pat. No. 5,748,775 issued May 5, 1998, is a method and apparatus for extracting moving objects by sequentially subtracting input images from an updated background image. More specifically, it records temporal changes in the video frame, such as shadows and illumination, and updates the background image accordingly for use in background subtraction. The method accounts for temporal changes by statistically processing subdivisions of each frame to obtain a statistical quantity that reflects the change in condition. This is performed for each pixel of each frame of video. Referring to FIG. 1A, consider a traditional method for object extraction. Camera is aimed at a fixed position capturing an image sequence where images 100, 101, 102, and 103 are individual frames trying to extract moving object 160. An attentive reader will notice that the background has multiple sections 110, 111, 112, each subject to individual temporal changes depending on the components within each. For example, if the weather becomes cloudy, section 110 will need to be updated to reflect the change; however, sections 111 and 112 could remain the same. In the same sense, the mountains in section 112 could become covered with snow while 110 and 112 remain unchanged, and so on. The considerable amount of combinations make a per pixel background calculation necessary for each frame. When considering one frame 104, traditional background subtraction first creates an updated background image 105 relative to that frame through techniques such as weighted averaging, and performs a subtraction of the binarized data to obtain an extracted image of the object, as seen in 106. This process is repeated for each subsequent frame. In many applications, this approach may be appropriate; however, it can be computationally expensive, seeing that each pixel in each frame of the video must be processed to update the background model.

There are many applications that do not require this level of computation—referring now to FIG. 1B, consider the same camera to be capturing the same sequence of images 120, 121, 122, and 123 with the same object 170 moving from left to right. In this approach, now consider 130 to be an isolated column of pixels positioned orthogonal to the object's direction of travel. Each column 140, 141, 142, and 143 represents one image in the image sequence and can be concatenated into a new image 150. This new image would then embody the entire video with each column representing one frame. In updating the background model, it would then be sufficient to account for temporal differences by processing each column of pixels in one image, rather than processing each pixel of many images. This method maintains a similar level of accuracy as that of traditional background updating, but because it is only analyzing one column of pixels for each frame of video, it uses a fraction of the computational power.

BRIEF SUMMARY OF THE INVENTION

The present invention is a computer-implemented method and system for transforming video data into a directional object count. In accordance with one approach, from each image in the image sequence a single column or row of pixels is isolated. The set of these is transformed via sequential concatenation into a separate image referred to herein as a "sweep image." Each sweep image is transformed into a per-pixel detection signal via techniques of background subtraction comprised of: a) initializing the one dimensional background model; b) processing the sweep image while adaptively updating the background model to account for temporal changes such as changes in illumination or ghosting; and c) detecting differences between the currently processed column of the sweep image and the background. In another embodiment, the system uses multiple 1-dimensional background models, for example, to model the scene element under both sunny and cloudy lighting. The per-pixel detection signal is then transformed into object location, and a detection count is performed via techniques including, for example, quasi-connected components (QCC) (see, for example, Boult, T. E., R. Micheals, X. Gao, P. Lewis. C. Power, W. Yin, and A. Erkan. "Frame-rate omnidirectional surveillance and tracking of camouflaged and occluded targets." In Proceedings Second IEEE Workshop on Visual Surveillance (VS'99)(Cat. No. 98-89223), pp. 48-55, IEEE, 1999, which is incorporated herein by reference) which obtain locational data about each object in the form of bounding boxes and their corresponding centroids. The position of centroids are evaluated with reference to the imaginary or drawn centerline separating direction of travel to produce a final directional object count.

In accordance with a second approach, the image sequence is transformed into multiple sweep images by selecting and concatenating data from two or more columns or rows of pixels. Transformations to object detections and location are then applied. By analyzing the relative motion between the leading edge of an object, one can determine the direction of travel. One embodiment does this by transforming each sweep image to obtain data about position and scale-invariant feature transformation points (SIFT points (see, for example, U.S. Pat. No. 6,711,293, "Method and apparatus for identifying scale invariant features in an image and use of same for locating an object in an image", David Lowe's patent for the SIFT algorithm, Mar. 23, 2004, which is incorporated herein by reference). A comparison of data of the set of points in each sweep image can determine object counts and each object's direction of travel. In another embodiment, these counts and estimates of direction are then combined with information about the centerline to produce a final directional object count.

In contrast to known art, both approaches use sequential concatenation combined with methods of one-dimensional background subtraction to obtain a directional object count. The present computer-implemented method and system drastically reduce the computational power required over the prior object extraction methods.

In another embodiment, the video subsystem is configured such that only one row or column from a 2-dimensional video sensor is all that is transferred to a main computer processor, thus reducing the data flow into the computer processor. In one embodiment this can be accomplished by using a one-dimensional region of interest on a video chip. In another embodiment, a thin 2-dimensional region is binned to produce the 1-dimensional signal. Those skilled in the art will appreciate how this can improve low light operation. Another embodiment might use triggered or asymmetric temporal sampling of the video signal to obtain the one-dimensional signal.

DETAILED DESCRIPTION

The present invention is a computer-implemented system and method for transforming video data into directional object counts.

Figure 9:
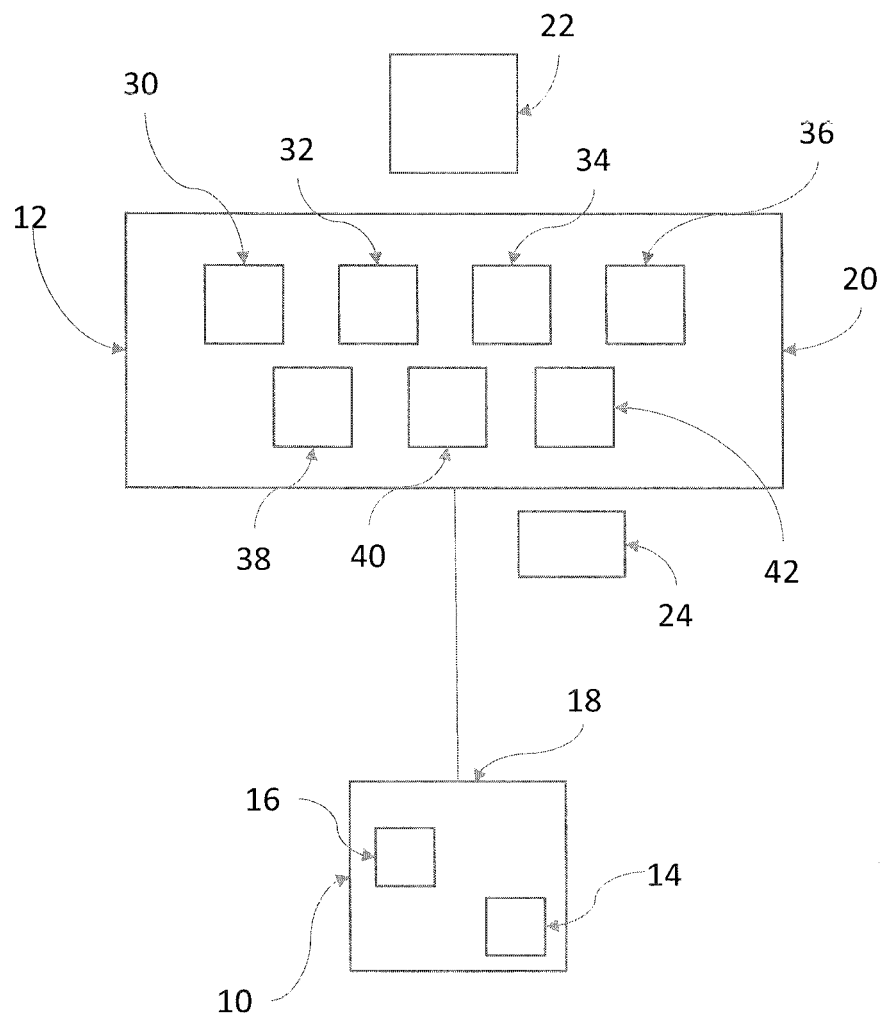
FIG. 9 is schematic of the present computer-implemented system.

Referring to FIG. 9, the present computer-implemented system and method as described below uses a video camera 10 in conjunction with a computer system 12 programmed to operate in the manner described herein for the purpose of transforming video data into directional object counts. The video camera 10 is a conventional video camera and includes a video sensor 14, a video processor 16, input/output 18 etc. and the computer system 12 is a convention computer system composed of a computer processor 20, a display 22, user input device 24, etc. As those skilled in the art will appreciate, the illustrative logical blocks, modules, and algorithm steps described in connection with the embodiments disclosed herein may be implemented as electronic hardware, computer software running on a specific purpose machine that is programmed to carry out the operations described in this application, or combinations of both.

With the foregoing in mind, and in consideration of the following description, the present system transforms a sequence of image data into moving object counts. This is achieved through the provision of an input means for sequentially entering input images containing a moving object region to be counted. In accordance with a preferred embodiment, the input means is embodied in the video camera 10 discussed above. The system also includes a sweep image generation means for extracting 1-dimensional regions for each image and combining them into a 2-dimensional sweep image, storage means for storing the 2-dimensional sweep image, object detection means for processing the 2-dimensional sweep image to detect object locations, counting means to process the detected object locations and determine object counts, a direction computation means that combines the object locations from the object detection means and the direction of motion is estimated based on the relative object position within the 1-dimensional slice, a ground-truth estimation means that estimates each object location within the 2-dimensional sweep image, a machine-learning means that uses the result of the ground estimation means to tune system parameters to improve performance, and an output means that communicates the object count to an external system. All of these elements are implemented via the computer system 10. For example, the sweep image generation means 30, object detection means 32, counting means 34, ground-truth estimation means 36, machine-learning means 38, and direction computation means 40 are implemented via software programmed onto the computer processor 20; the storage means 42 are implemented via computer memory integrated with the computer processor 20, and the output means is implemented via the display 22.

Figure 1A:
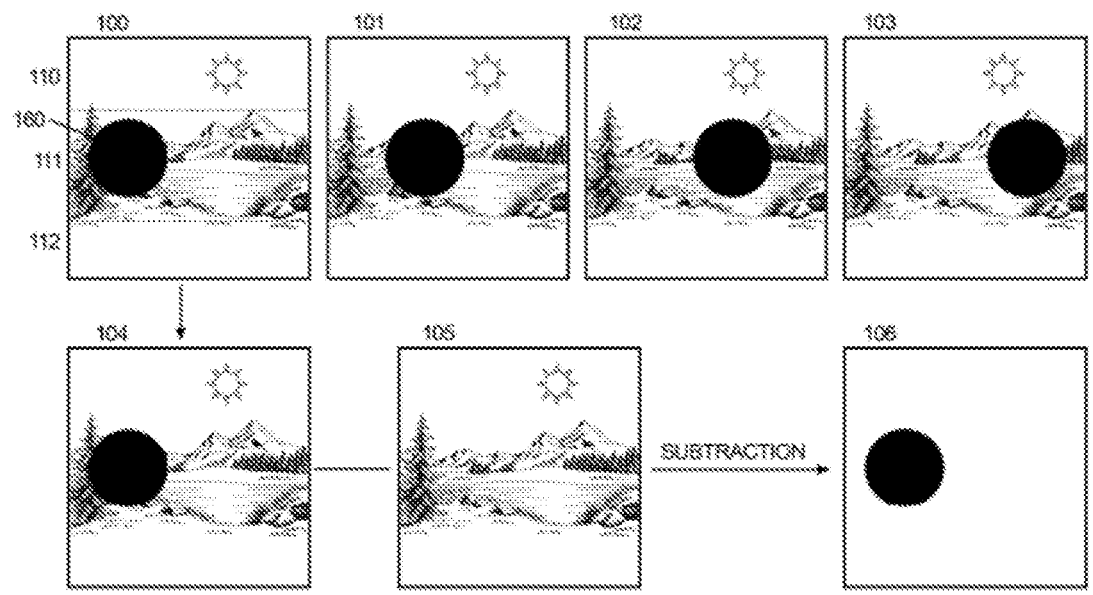
FIG. 1A shows a standard-background-subtraction process for a crowded background environment, where the video camera is aimed at a fixed position. Each frame of video for a duration of time is seen in 100, 101, 102, and 103. 104 depicts one frame in which the system is calculating an updated background image 105. The result of subtracting image 104 from its relative background 105 is shown in image 106.
Figure 1B:
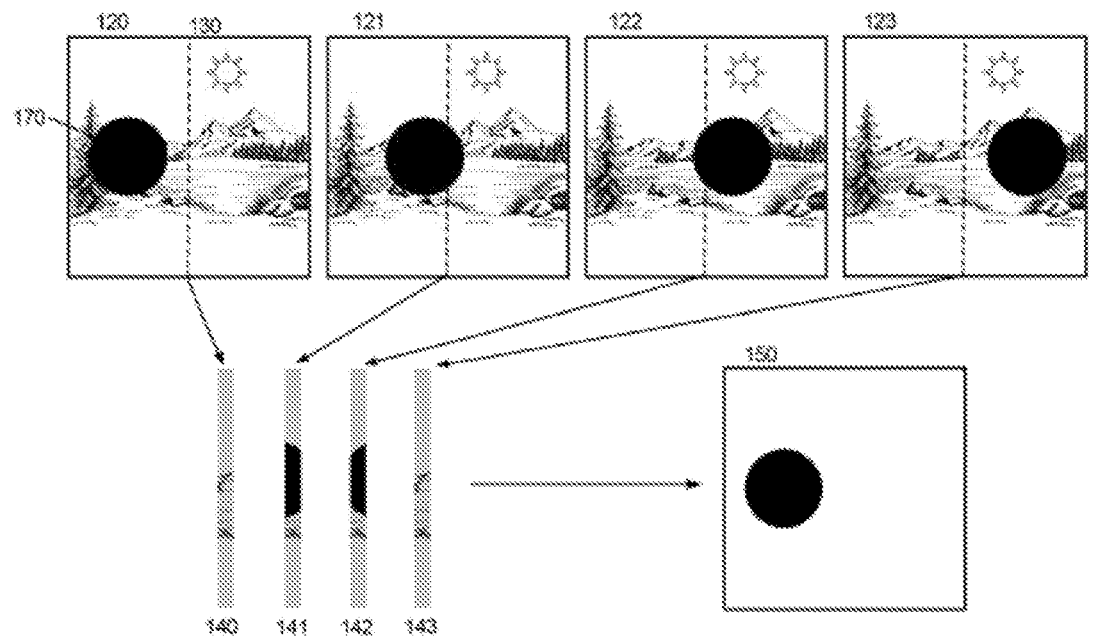
FIG. 1B shows the process of background-subtraction when used in combination with sweep images. Images 120, 121, 122, and 123 are sequential frames in an image sequence where a particular column of pixels 130 is extract and the set of extracted columns concatenated into corresponding columns 140, 141, 142, and 143 to create a new sweep image 150.
Figure 2:
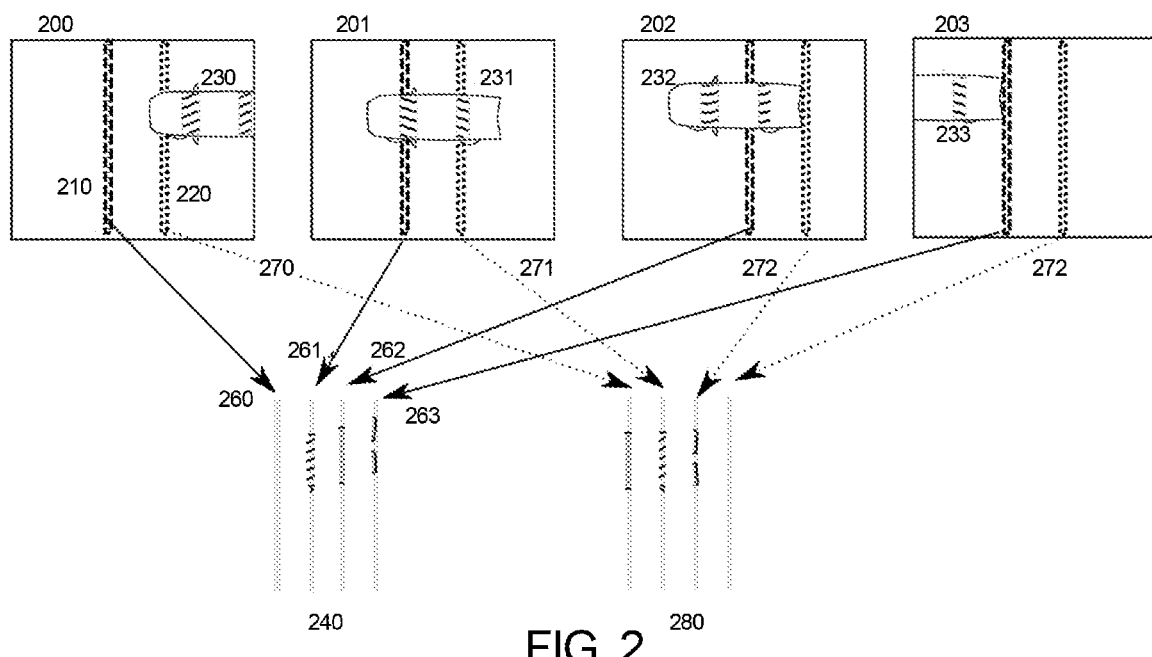
FIG. 2 shows a perspective view of a video camera looking directly down onto a street with 230, 231, 232, and 233 being one vehicle driving across the video camera's view. Each image 200, 201, 202 and 203 represents one frame of video, with there being many frames in between these examples. From each image, the transform isolates two columns of pixels 210 and 220 and, which are concatenated into separate sweep images. Column 210 is being captured for each frame of video to transform it into sweep image 240 while column 220 is being captured for each frame of video to transform it into sweep image 280.

In one embodiment, the approach uses a single row or column from a video camera 10, with the back-projected image of the row/column oriented approximately orthogonal to the expected direction of travel. Referring now to FIG. 2, consider a sequence of images 200 through 203, with the fixed column 210 collecting data over the sequence. The captured columns from each image (that is, 260, 261, 262 and 263) are concatenated along their short axis by the computer processor 20. The result is another image-like structure 240 which is referred to herein as a sweep image. A moving object 230, 231, 232, 233 will pass under the region associated with the columns, and when no object is underneath the image, it will produce a near constant image of the same spot on the ground. In general, an object produces a connected region in the sweep image with gaps showing the ground between such objects. If one wants to count objects, it is now sufficient for the computer processor 20 to detect and count objects in the sweep image to count how many objects passed under the area images by column 210. For example, one might generate a sweep image with python like pseudo-code, operating on the computer processor 20, similar to

```
frame = get_next_frame( )
frameset[i] = frame;
sweep1[i] = frame[:, 210]
sweep2[i++] = frame[:, 220]
```

Where 210 and 220 are the columns, that is 1-dimensional regions, use to create two sweep images. The sweep image would be collected over some period of time. The frameset array permits the association between column i of the sweep images and the frame from which it was obtained.

The generation of the sweep image does not require significant computational effort, and in fact, many modern cameras can be programmed to output only a small region of interest, even a single row or column. If the video camera 10 was running at 30 frames per second (fps), then each column of the sweep image represents $\frac{1}{30}$ of a second. This transformation from the original video domain to the sweep image provides a significant speedup, for example, a 1 Megapixel (1024×1024) sensor at 30 fps for 60 seconds can be transformed a single sweep image of 1800×1024. Rather than processing 1.8 Gigabytes of raw video data, the sweep image transformation reduces the processing to only 1.8 Megabytes. Compared to the sweep, regular video-based detection requires processing 10,000% more data—clearly a useful transformation. While this is described herein as selecting a column of data from a video sensor 14, those skilled in the art will recognize that it could be a row, a subset of rows/columns, or data from other sensors such as depth or range sensor. Without loss of generality, in the remainder, the term "column" is used herein to describe the sample data.

For each sweep image, one needs to detect moving objects for example, cars or people. Classic video-based detection/tracking approaches often use background subtraction, which is adapted on each frame to allow it to adjust to changing conditions (for example, changing lighting and shadows as well as interesting objects such as leaves/trees). The background is updated in regions where there is no detected object, for example, see Gao, Xiang, Terrance E. Boult, Frans Coetzee, and Visvanathan Ramesh. "Error analysis of background adaption." In Proceedings IEEE Conference on Computer Vision and Pattern Recognition. CVPR 2000 (Cat. No. PR00662), vol. 1, pp. 503-510. IEEE, 2000, which incorporated herein by reference. Because the present system can track objects from frame to frame, the updating of the background model can relatively easily avoid including the object. The sweep image, however, does not really have an ability to track and it does not have a background image. Instead, it is contemplated an advancement of the present invention is an approach to detection that combines a per-column multi-background model, with perpendicular edge detection and a quasi-connected component.

In one embodiment, the per-column "background" model is initialized as the median over a set of multiple columns of the sweep image. The median allows a robust initialization that only needs most of the columns do not contain objects, which can be computed

```
background1=np.median(sweep1,axis=1)
```

Other embodiments use a mean, and others use a mean after excluding some of the largest and smallest values. Unfortunately, in some applications, most columns in some sweep images will contain objects, so it is can be useful to have a saved background and, if the new background is very different, for example because the median finds too many cars, to just use the old one. In another embodiment, the background model is saved between sweep image processing and may use different saved models at different times of the day or for different weather conditions.

For the same reasons that video-based systems need to adapt their background, it may be better for the background column to be dynamic rather than static. In addition, especially in outdoor scenes, the lighting changes can be too fast for unchanging background columns to work effectively. Thus, the background may be adapted, but, unlike in video, detection may not be done to only update non-object regions seeing that cannot be tracked to predict object locations. To address this, in one embodiment, the per-pixel detection signal is used to drive the transformation that updates the background model based on dynamic conditions. If the detection signal differences are small, then the associated background model pixel is updated to reduce the difference. For example if it is decided that a difference of 19 was "small," the background might be updated something like:

```
backE = np.outer(background, np.ones(sweep1.shape( )[0])
diff = sweep1 - backE
diff[diff > 19] = 0
masked = np.ma.masked_where(diff == 0, backE)
background = masked.mean(axis=1)
```

If the difference is large for the background model and the horizontal edge signal is small, the background is only updated if a frequency counter hits a particular value. If the edge signal is large, the background is not updated. This mixed update transformation is often important to ensure the background is updated if it starts from a bad initialization or if the brightness changes from say a cloud or car headlights is significant. Those skilled in the art will see multiple potential update rules such as weighted averaging simple incrementing/decrementing, as well as other approaches as, for example, discussed in Gao, Xiang, Terrance E. Boult, Frans Coetzee, and Visvanathan Ramesh. "Error analysis of background adaption." In Proceedings IEEE Conference on Computer Vision and Pattern Recognition. CVPR 2000 (Cat. No. PR00662), vol. 1, pp. 503-510. IEEE, 2000, which is incorporated herein by reference.

The disadvantage of updating the background is the potential for a slowly moving or stopped object, which will produce no horizontal edges and blend into the background producing ghosting. One approach to address this is using order consistency, for example, as discussed in U.S. Pat. No. 7,006,128, Xie, Binglong, Visvanathan Ramesh, and Terrance Boult. "Object detection for sudden illumination changes using order consistency," issued Feb. 28, 2006, which is incorporated herein by reference. To address this, other embodiments will employ a multi-background model where, when computing the difference, one takes the difference from the closest background and updates only that one. This reduces the size of difference and reduces the false-detection from ghosts. But this reduced size can create gaps in the object. To address this, techniques such as morphology, flood fill or the more powerful quasi-connected components (QCC) (see, for example, Boult, T. E., R. Micheals, X. Gao, P. Lewis, C. Power, W. Yin, and A. Erkan. "Frame-rate omnidirectional surveillance and tracking of camouflaged and occluded targets." In *Proceedings Second IEEE Workshop on Visual Surveillance (VS'99)(Cat. No. 98-89223)*, pp. 48-55. IEEE, 1999, which is incorporated herein by reference) can be used to transform the intermediate per-pixel detection signal into the final object detect mask which is then transformed to object location and counts.

Figure 5:
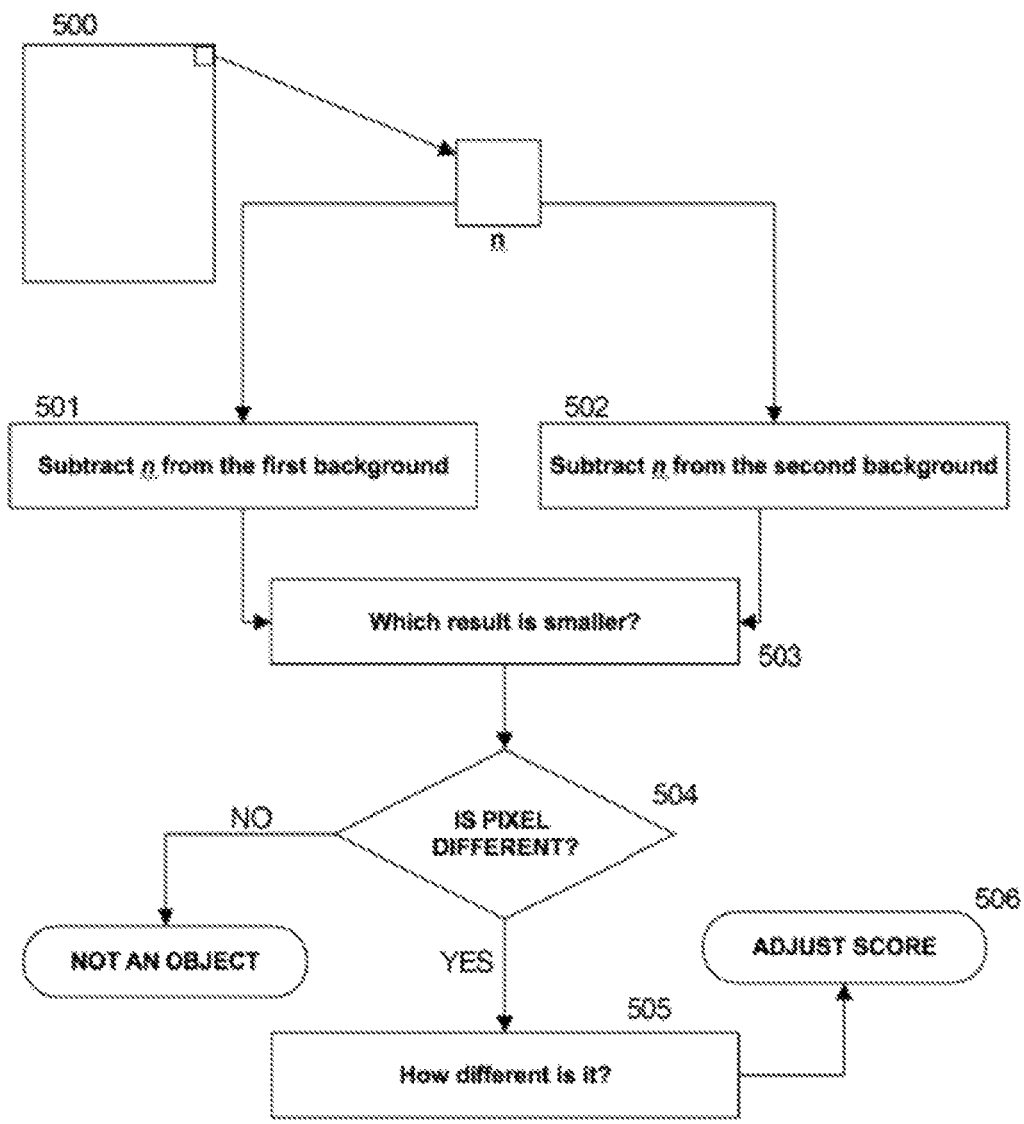
FIG. 5 is a flow diagram illustrating one technique to transform the sweep images and detect differences between the sweep image and its background using a multi-background model. The diagram illustrates the flow of processing one pixel from the sweep image.

In one embodiment, the detection signal is transformed via QCC on a per-pixel basis. The block diagram in FIG. 5 illustrates a simple QCC system configuration for detecting differences in a sweep image. Consider n to one pixel of sweep image 500. n is compared to each associated pixel positioned at the same row position of both the brighter and darker one-dimensional background models (step 501 and 502). The results from subtracting n from both backgrounds are compared to determine to which background n is closer, as seen in step 503. In doing this, it is then sufficient to use the closest background when determining if n contains an object allows ignoring changes in lighting. In step 504, the smaller difference is compared against a defined threshold to determine how different it is from its relative background. If the result is below the threshold, the pixel is disregarded. If the result is above the threshold, the pixel is considered separate from the background. In certain applications, the difference can then be used as a confidence measure indicating the level of which n differs from both background models (step 505). In such applications, we refer to this as the "score" (step 506).

Figure 6A:
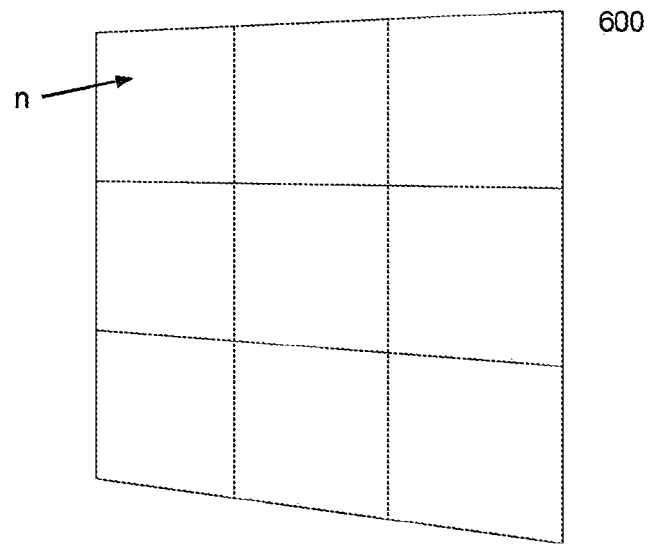
FIG. 6A illustrates a block of pixels 600 with n representing each pixel.
Figure 6B:
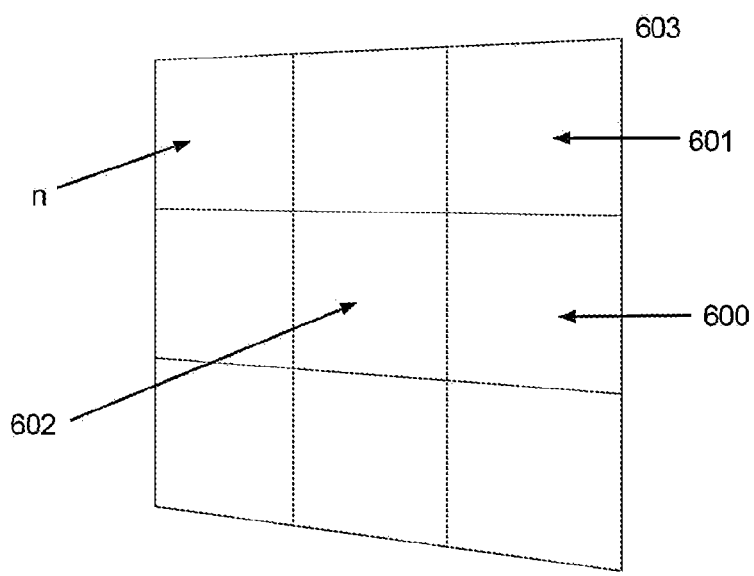
FIG. 6B shows a section of an image 603 where each subdivision consists of a group of pixels.

A problem with the above approach is that it can be computationally expensive seeing that it must process each pixel of each sweep image individually. In applications that demand a greater level of precision, such as detecting a small object or one that is not easily distinguishable, this may be required. However, in many applications, the object is large and easily distinguishable for example, a car driving on a paved street. Transforming the intermediate detection signal of each pixel is then unnecessary seeing that the difference is not confined to a single pixel, but can be observed on a larger scale. To address this, other embodiments in accordance with the present invention process groups or blocks of pixels. Referring to FIG. 6A, consider 600 to be a 3×3 block of pixels of a sweep image, where n is one pixel for each pixel contained by block 600. For each block, the combined average of each pixel n is computed and compared against the background model to determine whether the difference is above the high threshold or the low threshold and increment either the high or low threshold count for the entire block. Referring to FIG. 6B, consider image 603 to be comprised of block n, where each block n is a 3×3 grid of pixels. The same block 600 as seen in FIG. 6A is now shown in comparison to its surroundings. Once it is determined to be sufficiently different from the background model, one tries to identify the object by doing some form of connected components, for example to connect it to neighboring blocks by processing the block directly above it (601) and the block directly to the left of it (602). If the neighboring blocks (601, 602) are sufficiently different from both background models, they are considered to be part of the same object, and a connection is drawn. The process is repeated for each subsequent block of pixels until a final object detection mask is created. Connected components are a common part of many vision libraries, for example in open CV (see, for example, Bradski, G., & Kaehler, A. (2008). Learning OpenCV: Computer vision with the OpenCV library. "O'Reilly Media, Inc.", which is incorporated herein by reference), one could compute the objects using the computer processor 20 with something like

```
ret, thresh = cv2.threshold(diff,0,255,cv2.THRESH_BINARY+
cv2.THRESH_OTSU)
connectivity = 8 # Choose 8 neighbor connectivity type
objects = cv2.connectedComponentsWithStats(thresh,
connectivity, cv2.CV_32S)
```

In doing background adaption, it is sufficient but may not be necessary to also update the background models infrequently as each column is only ⅟₃₀ of a second apart, so lighting changes are expected to be small. In one embodiment, the background pixels are updated only of their row number modulo a parameter is constant, for example, update background_pixel( ) if (row % uparm==0).

Those skilled in the art will see other ways to update infrequently as shown with reference to Gao, Xiang, Terrance E. Boult, Frans Coetzee, and Visvanathan Ramesh. "Error analysis of background adaption." In Proceedings IEEE Conference on Computer Vision and Pattern Recognition. CVPR 2000 (Cat. No. PR00662), vol. 1, pp. 503-510. IEEE, 2000, which is incorporated herein by reference.

In one embodiment, the thresholds for the comparison of the raw pixel signal are also adapted. This can be done by considering the number of pixels above the high or low threshold, which can also be an indication of the need to update the background model. Because some camera noise is expected, if the number of pixel differences over the low threshold is below a particular value, this may indicate the threshold is too high or that the background is being updated too often. In the same sense, if the frequency counter of the high threshold is above a particular value, it may indicate the threshold is too small or that the background needs to be updated more often. In both cases, the thresholds or background can be adjusted accordingly to maintain a desired range of pixels above the low threshold but below the high threshold which can maintain sensitivity under dynamic conditions.

Once the per-pixel signal detection is transformed into an object detection mask, the mask is transformed into an object count. However, a problem that may arise if objects other than those of interest were to pass through the scene in the same direction as the target object. Such uninteresting objects might also be counted in the final object detection count. To address this, after the final object detection mask is created, each connected component is compared against a series of conditions associated with the target object. For example, consider a video camera looking directly down on a street, counting the number of vehicles that pass through the frame. If the video camera is fixedly positioned above traffic, we can roughly estimate how the car should appear with indications of its area or approximate shape. In such cases, it would be sufficient to use these metrics as an indicator of whether a detected object should be considered in the final object count. Many computer vison software libraries can compute these and other parameters of detected object, for example the OpenCV (see, Bradski, G., & Kaehler, A. (2008). Learning OpenCV: Computer vision with the OpenCV library. "O'Reilly Media, Inc.", which is incorporated herein by reference) example above computes object statistics as part of the connected components processing. One skilled in the art will observe that these size conditions are just an example and many other differentiating properties associated with the target object could be combined in a filter. In addition, the object's score can also be transformed into a confidence measure of its relevance. For example, if the detection is within the defined area, but its score is below the minimum score threshold, it may be discarded as being something uninteresting, for example, a shadow.

Figure 3:
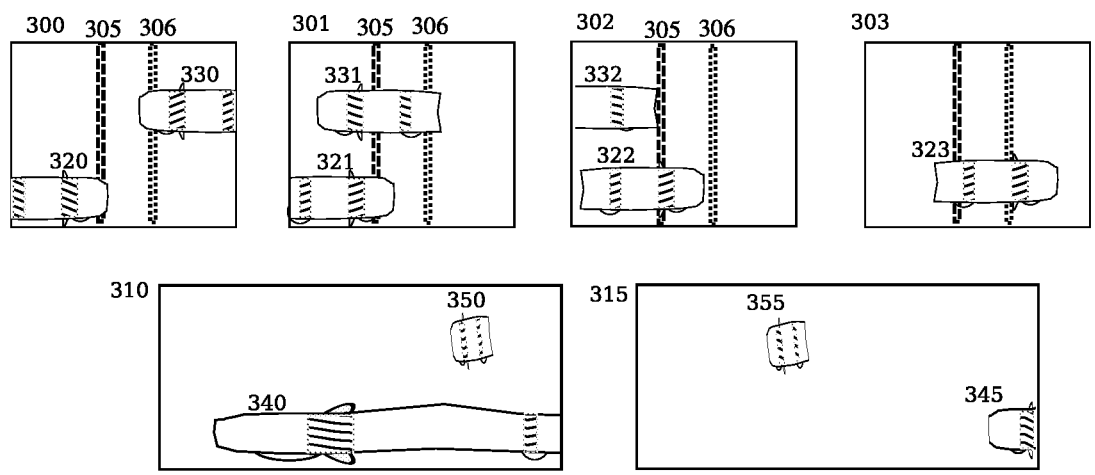
FIG. 3 illustrates an image sequence with images 300, 301, 302, and 303 being individual frames capturing two moving vehicles. Images 310 and 315 are sweep images made from the concatenation of two columns of pixels. The vehicles in images 310 and 315 correspond with those in images 300-303; however, the difference in appearance is used to illustrate the elongation and compression that can arise in sweep images.

While it is sufficient to count objects in each sweep to get a count, determining direction is not as simple as it is for sequential video image processing, where one can compare the centroid in successive frames to determine direction. One difficulty with processing a single sweep image is that direction can be more difficult to detect since the sweep image does not directly encode direction motion. Referring again to FIG. 2, consider a second column 220 from the same sensor, and concatenate the image data collected from this new column 270, 271, 272, 273, another sweep image 280 is obtained. The columns from each image can be captured at the same time (for example, 260 and 270 are from the same frame time, 261 and 271 are from the same frame). However, since the object location at each frame capture will not put it under both columns at the same time, the two sweep images will differ, and the differences encode the direction of travel. For example, in FIG. 3 multiple frames 300, 301, 302, 303 are shown and two moving objects with object 330 moving right to left and object 320 moving left to right. The frames here are samples, with many frames between each example shown. Note that direction of travel does not show up in the shape in the sweep images 310 and 315, because in the sweep the left to right direction show is time, not space. However we can use the relative position between two sweep images to determine direction. If the first column 305 for generating the first sweep image 310 is to the left of the second column 306 that generates the second sweep image 315, then an object 320 is traveling from left to right (320, 321, 322, 323). The object will be seen by the first column 305 before it appears in the second column 305. Thus, the location of the front edge of the object 350 in the first sweep image 310, will be to the left of the front edge of the object 355 in the second sweep image 315. Similarly, if the object is traveling from right to left (330, 331, 332, 333), it will be seen by the second column 306 before it appears in the first column 305, and hence the location of its front edge in the first sweep image 310 will be to right of the front edge in the second sweep image 315. In an embodiment each column produces its own sweep image so, so in pseudo code operating on the computer processor 20, we could compute direction like this:

```
sweep1.obj[i].dir=left if(sweep1.obj[i].x < sweep2.obj[i].x)
sweep1.obj[i].dir=right if(sweep1.obj[i].x > sweep2.obj[i].x)
```

The objects in the sweep image may seem distorted compared to the original object, for example, compare 340 and 323. Such distortions can make the obvious idea of matching object generally useless unless the objects are moving at some constant velocity. While this example shows one object compressed and one elongated, this is not a function of the direction of travel. Rather, it is a function of the amount of time the object spends under the particular column. An object moving faster or even accelerating while under the column will appear to be compressed as seen in 350 and 355. Oppositely, an object that moves slower or even stops while under the column will appear to have been stretched 340. It is further contemplated that while the distortions make matching centroids, or even general image template matching impossible, some aspects of the image (for example, the front edge of the object or certain unique defining features of an object) can still be matched to determine direction of travel. Those skilled in the art may recognize that other sets of small and distinctive features, for example, SIFT features (see, U.S. Pat. No. 6,711,293, "Method and apparatus for identifying scale invariant features in an image and use of same for locating an object in an image", Mar. 23, 2004, which is incorporated herein by reference) may also be matched with the overall matching being used to more robustly determine the direction of travel.

The preceding disclosure has only discussed how the relative position between the sweep images, which is referred to herein as "a motion cue," can be used to determine the object's direction of travel. However, those skilled in the art will note that the type and amount of compression/elongation can also provide an estimate of object speed. If the object is slower or even stops under the column, the object becomes elongated. The object can even be compressed in some regions and elongated in others, for example, if it was stopped, then started moving quickly. If the object has some lateral motion relative to the column, then the object becomes skewed as seen in 340. With two or more sweep images generated from close columns the elongation can differentiate between stopping, producing identical strips in both sweep images, and slow vehicle speeds which elongates but the images vary differently between the two sweep images.

Figure 4:
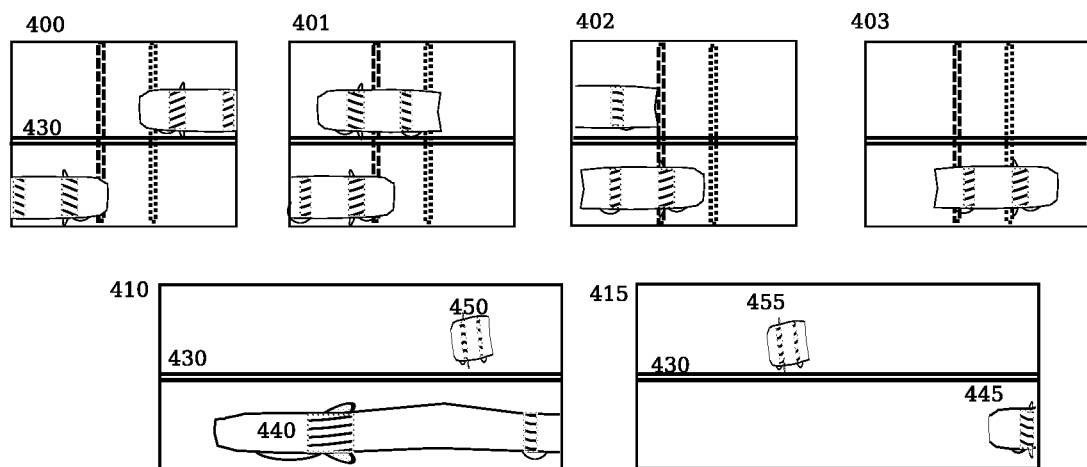
FIG. 4 is a set of two sweep images 410 and 415. The figure shows an imaginary centerline 430 for embodiments of the present invention that use information about the centerline to indicate the direction of travel.

For many applications (for example, counting vehicles or people), there are rules of behavior that govern the direction of flow and position in the field of view. In FIG. 4, one sees two sweep images (410, 415) of two objects (440/445) and (450/455). In a vehicular application, there is often a real or imaginary line on the road 430 that separates the direction of leftward and rightward travel. When there is only one object in the scene, it may stray over the line, but it is uncommon for the center of the object to cross over that real or imaginary line. While a painted line is easy to use, an effective imaginary line can be learned from sample data. Thus, in one embodiment, the vertical centroid of each object in the sweep image relative to the center point provides an indication of travel. In another embodiment, the system learns to estimate the imaginary centerline, for example, doing regression to optimize the accuracy of direction of travel given training data. With a positional estimate of direction, even a single sweep image can be used to compute counts of objects moving in each direction. For example, if we assume the sweep image is columns and the center line 430 crosses the column at a y location of, for example, centerline y and further assume that the upper part of the sweep image above centerline corresponds to the lane of traffic moving toward the left, the direction would be computed by the computer processor 20 similar to sweep1·obj[$i$]·dir=left if (sweep1·obj[$i$]·y<centerline·y)

Not only can the position provide an indication of the direction, but the distance from the centerline can also be transformed into a confidence measure on the direction. Object centroids have greater confidence with greater distance from the centerline. This confidence can be useful when fusing position-based direction with the motion cue data between the different sweeps, with two positional estimates and one relative motion-cue estimate. Experience with real data has shown that significant elongation distortion tends to occur when objects are moving very slowly or stopped which can make detection of the relative motion more difficult, especially if the object extends beyond the bounds of one or both sweep image. But a problem also presents a potential solution in that these slow-moving or stopped situations are almost always in accordance with conventions (laws) regarding a position on the road, which then determines the direction of travel.

An additional advancement of the present invention is to include directional derivatives (also known as "edges") as well as, or in place of, the difference from the background model. In normal video, edges can be in almost any orientation because object edges can exist in any orientation. In the column-based sweep image, edges within the object will always appear vertical, that is, can occur only along the column. Edges in the horizontal direction (perpendicular to column) occur only with an edge on the object moving past the columns. When there is no object, there are no horizontal edges. Thus, the object detection signal is a transformation that combines the difference from the background model with a horizontal edge signal. The per-pixel model can be applied per channel in a multi-channel (for example, RGB) image or combined across channels. A weighted sum is often sufficient, but those skilled in the art may be able to apply multiple standard fusion approaches to these transformed signals to produce alternative per-pixel detection signal. Expanding the example from above with the simplest type of directional derivative using numpy's discrete difference function (diff) the computer processor 20 would use a pseudo code such as

```
edge = np.diff(sweep1,axis=0)
backE = np.outer(background, np.ones(sweep1.shape( ) [0])
diff = edge + (sweep1 - backE)
ret, thresh = cv2.threshold(diff,0,255,cv2.THRESH_BINARY+
   cv2.THRESH_OTSU)
connectivity = 8  # Choose 8 neighbor connectivity type
objects = cv2.connectedComponentsWithStats(thresh,
   connectivity, cv2.CV_32S)
```

By combining the edge filter with the background difference as above, the object will tend to be fully connected, while having better differentiated boundaries and suppressing more background noise. If one uses just the directional derivatives then the object may break apart into the leading and trailing edge, but by connecting objects as above, and then if the object's horizontal component is thin, combining it with the next along a row, this problem can be reduced.

While the above have described the invention with drawing/examples mostly drawn from detection and counting vehicles, those skilled in the art will see that embodiments could be used to count a wide variety of moving objects, for example, cells in flow cytometry other biological science applications, customers in stores, pedestrians in walkways or hallways, items moving on conveyor belts, or even animals moving through a controlled area, etc. In many of these, the low-cost and low-power requirements can offer significant business advantages.

In a preferred embodiment, video is transformed into a sweep image by the computer processor 20, as in paragraph 28 and FIG. 2. The computer processor 20 then transforms the sweep image into the per-pixel detection signal image using the background as well as horizontal-only edge information, all of this while updating the multi-background model (see paragraphs 30-32). The computer processor 20 then transforms the per-pixel detection via QCC (see paragraphs 31-33) into a detection count with object locations as centroid and bounding boxes. The computer processor 20 then combines locations with information about the centerline to obtain an estimate of the object direction.

In a second preferred embodiment, these transformations are applied to generate sweep images which are then transformed into detection signal images which are transformed to yield two sets of objects with location and direction estimates, wherein features such as leading edges or SIFT points (see U.S. Pat. No. 6,711,293, "Method and apparatus for identifying scale invariant features in an image and use of same for locating an object in an image", Mar. 23, 2004, which is incorporated herein by reference, and the discussion in paragraph 12/13) are compared between the two sweep images to produce another direction estimate, which is then fused with the location estimates to produce a final output of directional count. The fusion could use the input with maximum confidence, or it could take a vote (if there are 3 estimates, for example, relative order, SIFT matching and center-line position). This second-preferred embodiment can be computed on very inexpensive hardware such as the Raspberry Pi.

Different embodiments for the transformation from video to sweep image, to directional counts, can have a multitude of parameters in the transformation algorithm. In some embodiments, machine learning (ML) can be used to estimate these parameters, for example, the update rates, sizes for combining detected regions, location of the center-line for computation of direction of travel, etc. One approach to ML for these estimations would be to use gradient descent, or stochastic gradient descent, or a tool like hyperopt to find the parameters, for example, from hpsklearn import HyperoptEstimator

```
# Load Data into train_data, train_label and test_data, test_label
...
# Create the ML object to optmize parms
hyper = HyperoptEstimator( )
# Search the space of classifiers and preprocessing steps and their
# respective hyperparameters in sklearn to fit a model to the data hyper.fit(train_data, train_label)
# Report the accuracy of the classifier on a given set of data
score = hyper.score(test_data, test_label)
# Return instances of the classifier and preprocessing steps
model = hyper.best_model( )
```

Those skilled in the art will see ways to apply other existing machine learning techniques to find parameters that enhance the detection accuracy of sweep-image based approaches.

One difficulty with using ML for such parameter estimation is the need for ground truth data. Since the optimal set of these parameters may depend on the properties of the camera used, the location of installation, the lighting, etc. this automated estimation installation site, it's lighting, camera, etc., the ability to determine optimized parameters quickly can be crucial. Some ground truth, such as object counts and directions can be obtained with other means, for example, pneumatic vehicle counters.

Figure 7:
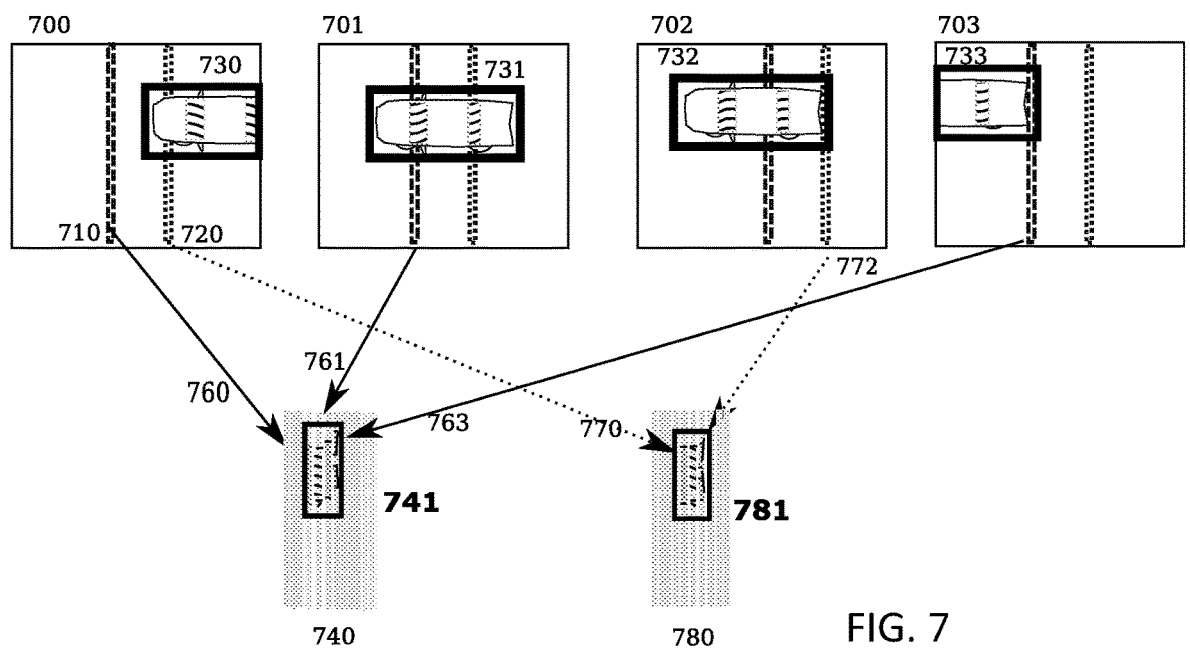
FIG. 7 illustrates using an external process that detects objects in the video frames which can be transferred to produce ground-truth boxes in the sweep image.

To make it easier to provide more detailed "ground truth" labeling for the machine learning, in another embodiment, a training system would produce the "ground truth" by using a second algorithm, such as a deep neural network that require much more powerful/expensive computation, for object detection on the raw video. Given the more powerful system's detections in the raw video, a ground truth mask for the sweep image can be automated by extracting the same one-dimensional slice(s) used for sweep image generation. For more detailed ground-truth, a more computationally expensive tracker could be applied to the raw video. In FIG. 7 various frames 700,701,702,703, are shown with bounding boxes 730,731,732,733 respectively detected by the computational more expensive video-based tracker, for example, a deep network running on a Graphics Processing Unit integrated into the computer system 12. For each such box one can determine the intersection of the bound-box from the video frame with the back-projection of the column (710 or 720) can be used to generate a corresponding bounding box in each sweep image. For example, when the leading edge of the bounding box in frame 701 crosses the line 720 it produces 770 the leading edge of the bounding box 781 in the sweep image 780. Similarly in frame 703 when the trailing edge of the bounding box 733 crosses line 710 it produces 763 when the trailing edge of the box 741 in sweep image 740. These bounding boxes "ground truth" sweep images can then be used for machine learning to search for the parameters that optimize the sweep image-based transformation for the particular deployment location/conditions. While we described this above in terms of bounding boxes it should be obvious that the ground-truth region in the sweep image can also be viewed as a sequence of 1-dimensional boxes, that is line segments, which can provide a tighter set of ground truth.

Figure 8:
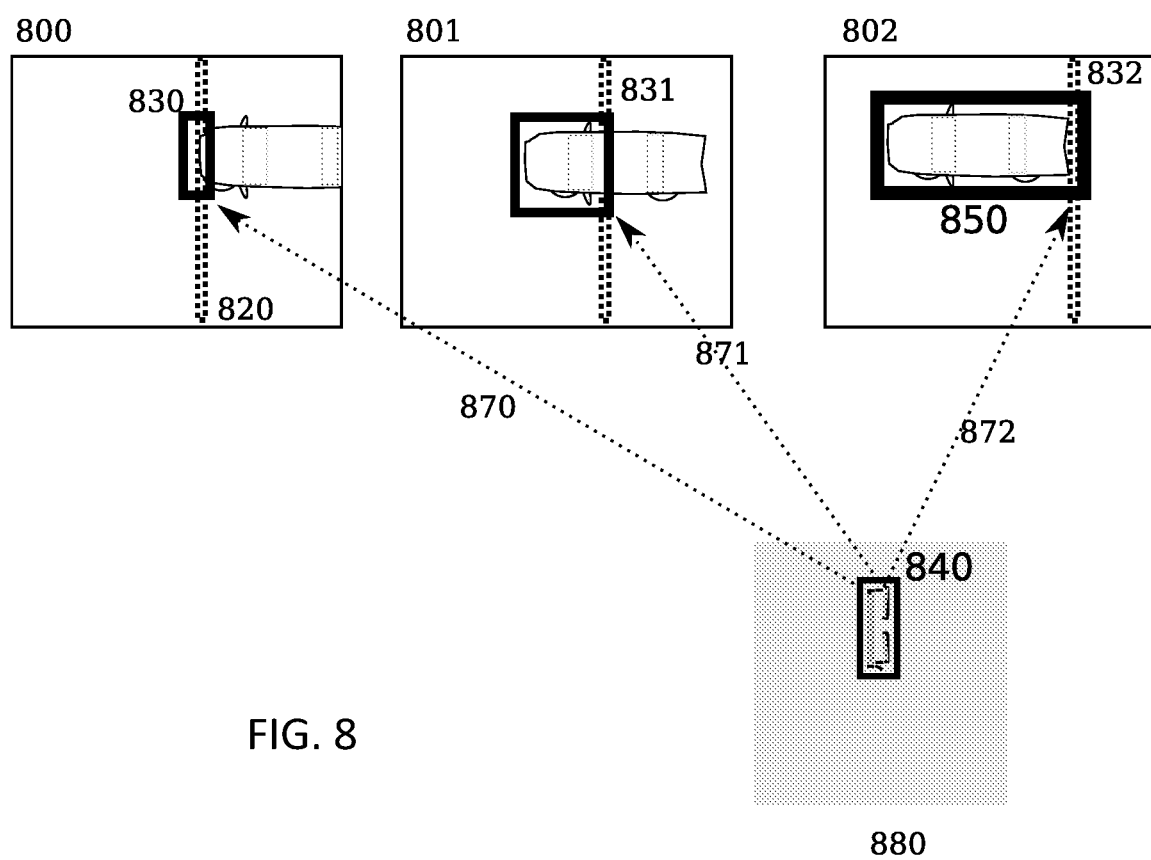
FIG. 8 shows using ground-truth boxes in the sweep image to determine ground-truth boxes in raw video frames.

This mapping between ground truth boxes in sweep images and frames is a bi-directional transformation of data using coordinates in the sweep images as a time index into the sequence of video frames. Thus, a bounding box in the sweep image can also be used to determine a sequence of bounding boxes in the raw video. Thus, labeling data in the sweep image can be used to determine ground truth for training data from the video. FIG. 8 illustrates how the bounding box 840 in a sweep image 880. The leading edge of the box can be used to determine 870 the frame 800 at when the target 830 crosses the associated line 820. With this the local neighborhood prescribed, one can then define a region to track the leading edge of the object 840 through the video frames. In addition the ground truth box in the sweep images continues to produce intersections 871 with the line 820 in other frames 801 expanding the back edge of the object 831 and providing an estimate of its vertical location in that frame. The final trailing edge of the ground truth box in the sweep image predicts 872, the trialing edge 832 of the object crossing line 820. With the front edge detected and tracked 830 and trailing edge 832 identified the object in the frame can be converted to a template 850 and tracked in the video, ideally both forward and backwards in time. Given the of the target region initialization is determined from these boxes, such tracking could be done using with standard visual tracking tools such as the Channel and Spatial Reliability Tracker (CSRT) in OpenCV, and the track in each frame can provide the ground truth boxes for the original video frame. Note that in the application of embodiment described in FIG. 8, the boxes in the sweep image could be hand-drawn ground truth which could then be transferred to the video and used to speed up the ground-truth labeling of video data for training video-based object detector. This alone is a useful novel application of such a transform since a user can take 10 seconds to ground-truth label objects in a single sweep image that represents 5 min, or 9000 frames, of video. With the need for large amounts of labeled video for training deep networks to do video object detection/localization the orders of magnitude speedup in labeling is valuable.

The combination of both transformations described in FIGS. 7 and 8 could be combined. The hand-labeled sweep image could be used to train or fine tune a video-based detector which could then be applied on new video data to provide boxes on the sweep image to transformations, a deep learning system could provide bounding boxes to improve the learning of a the sweep image detector. Then the improved detections on the sweep image, potentially with users' corrections, could be used to provide more training data to improve the video-based detector which could then be used to provide more data to improve the sweep-based detector.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A system for transforming a sequence of image data into moving object counts comprising:
 a video camera including a video sensor, a video processor, and input/output for sequentially entering input images consisting of a single column containing a moving object region to be counted; and
 a computer system receiving the input images consisting of a single column containing the moving object region to be counted from the video camera, creating a sweep image, and determining object counts by counting objects in the sweep image, the computer system further providing for machine learning and directional computation; and
 a display that communicates the object count to an external system;
 wherein the computer system applies sweep images for machine learning to search for the parameters that optimize sweep image-based transformation.

2. The system according to claim 1, wherein the computer system estimates an imaginary centerline.

3. The system according to claim 1, wherein data in the sweep image is used as training data.

4. A system for transforming a sequence of image data into moving object counts comprising:
 a video camera including a video sensor, a video processor, and input/output for sequentially entering input images consisting of a single column containing a moving object region to be counted; and
 a computer system receiving the input images consisting of a single column containing the moving object region to be counted from the video camera, extracting 1-dimensional regions for each image and combining them into a 2-dimensional sweep image, and determining object counts by counting objects in the sweep image, the computer system further providing for machine learning and directional computation; and
 a display that communicates the object count to an external system;
 wherein the computer system applies sweep images for machine learning to search for the parameters that optimize sweep image-based transformation.

5. A system for transforming a sequence of image data into moving object counts comprising:
 a video camera including a video sensor, a video processor, and input/output for sequentially entering input images consisting of a single column containing a moving object region to be counted; and
 a computer system receiving the input images consisting of a single column containing the moving object region to be counted from the video camera, extracting 1-dimensional regions for each image and combining them into a 2-dimensional sweep image, and determining object counts by counting objects in the sweep image, the computer system further providing for machine learning and directional computation; and
 a display that communicates the object count to an external system;
 wherein the computer system estimates an imaginary centerline and the imaginary centerline is determined by doing regression to optimize accuracy of direction of travel.

6. A system for transforming a sequence of image data into moving object counts comprising:
 a video camera including a video sensor, a video processor, and input/output for sequentially entering input images consisting of a single column containing a moving object region to be counted; and
 a computer system receiving the input images consisting of a single column containing the moving object region to be counted from the video camera, extracting 1-dimensional regions for each image and combining them into a 2-dimensional sweep image, and determining object counts by counting objects in the sweep image, the computer system further providing for machine learning and directional computation; and
 a display that communicates the object count to an external system;
 wherein the computer system constructs the 2-dimensional sweep image by storing an identifier of each frame and wherein detected object location is then used to determine first and last frames when the object was passing over a back-projection of the 1-dimensional region, with frames of video then being used for training a machine learning model to optimize detection parameters from an original video.

* * * * *